US005587086A

United States Patent [19]
Danda et al.

[11] Patent Number: 5,587,086
[45] Date of Patent: Dec. 24, 1996

[54] PURIFICATION OF AQUEOUS MEDIA USING ALUMINUM POLYCHLORIDE/IRON COMPOUND/SALT-BASED COAGULANT COMPOSITIONS

[75] Inventors: Sylvain Danda, Marly la Ville; Magnus Kvant, Niederroedern; Yvette Pescher, Bagneux, all of France

[73] Assignee: Kemrhone France, Courbevoie Cedex, France

[21] Appl. No.: 458,698

[22] Filed: Jun. 2, 1995

Related U.S. Application Data

[62] Division of Ser. No. 248,178, May 24, 1994.

[30] Foreign Application Priority Data

May 24, 1909 [FR] France ................................ 93 06159

[51] Int. Cl.⁶ .................... C02F 1/52; C02F 1/56
[52] U.S. Cl. ............................ 210/723; 210/732
[58] Field of Search ............................ 210/723, 724, 210/732, 733, 734

[56] References Cited

FOREIGN PATENT DOCUMENTS 184489 11/1982 Japan.

*Primary Examiner*—Neil McCarthy
*Attorney, Agent, or Firm*—Burns, Doane, Swecker & Mathis, L.L.P.

[57] ABSTRACT

Coagulant compositions, advantageously solvent (water) solution thereof, well suited for the treatment/purification of impure aqueous media, e.g., surface waters, wastewaters, effluents, etc., via sedimentation technique, comprise (i) at least one basic aluminum polychloride or polychlorosulfate, (ii) at least one iron(II) and/or iron(III) compound, and (iii) at least one alkali metal and/or alkaline earth metal halide.

11 Claims, No Drawings

PURIFICATION OF AQUEOUS MEDIA USING ALUMINUM POLYCHLORIDE/IRON COMPOUND/SALT-BASED COAGULANT COMPOSITIONS

This application is a divisional of application Ser. No. 08/248,178, filed May 24, 1994.

BACKGROUND OF THE INVENTION

1. Field of the Invention

The present invention relates to novel coagulant compositions comprising at least one basic aluminum polychloride or polychlorosulfate, at least one iron compound and at least one salt, and to a technique for the formulation of such novel compositions.

The present invention also relates to the use of such compositions as coagulating agents in the treatment of aqueous media and, more particularly, for water purification.

2. Description of the Prior Art

It is known to this art that the principal methods for water treatment (surface waters, effluents, wastewaters, residual water, liquid waste, and the like) essentially include a stage for the removal of suspended matter by gravity settling (sedimentation), the recovered supernatant clarified water then being subjected to a filtration stage.

To improve the conditions for sedimentation, and thus the quality of the treated water, coagulating agents have long been employed, such as, especially, iron(II), iron(III) or, alternatively, aluminum chlorides, sulfates or chlorosulfates.

Given that each of these agents is at least in part effective, certain problems remained, due mainly to increasingly strict environmental regulations regarding the quality of treated water.

Thus, iron-based compounds, essentially compounds of ferric iron, have a better capacity to render sulfides insoluble, but present the disadvantage of coloring the treated water. On the other hand, the use of aluminum-based coagulating agents does not impart a specific color to the water, but it is not possible to completely remove the sulfides therewith.

One improvement in the processes for the treatment of water employing the flocculation/settling techniques has entailed using these two types of coagulating agents in the same process. However, such methods have proved to be complex in actual practice. Indeed, in addition to multiplying the sources of coagulating agents, it is necessary to allow a specific period of time between introduction of each of said coagulating agents to permit any combined or synergistic effect by reason of the conjoint use thereof.

Moreover, solutions have also been used comprising the two coagulating agents. However, it has been observed that such mixtures were not stable and that a precipitate or a gel appeared after only a few hours, indeed a few days at most.

For this reason, the operation of pumping these mixtures, during water treatment, is complicated and the correct or proper metering of the coagulating agents in the medium is difficult to achieve or control. Consequently, in order to avoid these difficulties, it is necessary to prepare the solutions shortly prior to their use. This, of course, presents a significant disadvantage.

SUMMARY OF THE INVENTION

Accordingly, a major object of the present invention is the provision of novel coagulant compositions comprising at least one coagulating agent based on aluminum, and more particularly on basic aluminum polychloride or polychlorosulfate, and at least one iron-based coagulating agent, which novel compositions are stable over time and otherwise avoid or conspicuously ameliorate the above disadvantages and drawbacks to date characterizing the state of this art.

Another object of this invention is the provision of certain technique for the formulation of the subject novel compositions.

Still another object of the present invention is the provision of a process for the treatment of impure aqueous media using the subject novel compositions.

Briefly, it has now unexpectedly been found that the addition of a salt of alkali metal and/or alkaline earth metal halide type efficiently stabilizes mixtures based on the two coagulating agents indicated above. Indeed, solutions of such tripartite compositions do not precipitate even after several months of storage.

DETAILED DESCRIPTION OF BEST MODE AND PREFERRED EMBODIMENTS OF THE INVENTION

More particularly according to the present invention, the treatment/purification of impure aqueous media is greatly simplified with respect to the known processes employing only the aforenoted two types of coagulating agents.

Hence, in accordance with this invention it is no longer necessary to multiply the mixtures each comprising the required coagulating agents, whether during use, in the event of processes which successively employ the two compounds, or on storage, in the event of treatment using a mixture of the two compounds, which mixture is prepared shortly prior to the use thereof.

The subject compositions thus comprise at least one basic aluminum polychloride or polychlorosulfate, at least one iron(II) and/or iron(III) compound, and at least one salt selected from among the alkali metal and/or alkaline earth metal halides.

The present invention also features a process for the preparation of the aforementioned compositions, comprising intimately admixing/contacting at least one aluminum-based compound, selected from among basic aluminum polychlorides or polychlorosulfates, with at least one compound based on iron(II) and/or on iron(III), said compounds being, one and/or the other, mixed beforehand with at least one salt selected from among the alkali metal and/or alkaline earth metal halides.

This invention also features a process for the treatment/ purification of impure aqueous media using the subject coagulant compositions.

In particular according to the present invention, the subject compositions are based on at least one basic aluminum polychloride or polychlorosulfate, on at least one iron-based compound and on a salt.

The compositions of the invention are advantageously stable and pumpable solutions.

Preferably, the solvent for the subject compositions is water.

By the term "basic aluminum polychloride or polychlorosulfate" are intended compounds having the following general formula:

$$[Al_n(OH)_mCl_{3n-m-2k}(SO_4)_k][H_2O]_z \qquad (I)$$

in which n, m and k are positive numbers; 3n-m-2k is positive; z is a positive integer at least equal to 1; and k is a number ranging from 0 to 0.4×n.

In a preferred embodiment of the invention, the composition is based on at least one aluminum-based compound having a coefficient k of zero.

Thus, the compositions according to the invention preferably comprise an aluminum-based compound whose coefficient k is zero.

For purposes of simplification, hereinafter the term "aluminum polychloride" will be used to denote both basic aluminum polychloride and basic polychlorosulfate.

The basicity of the aluminum-based compound, corresponding to the ratio (expressed as %) of the number of (OH) groups divided by 3 times the number of aluminum atoms, i.e., (m/3n)×100, ranges from 10% to 80%.

The basicity of this compound preferably ranges from 20% to 80%.

In another preferred embodiment of the present invention, the aluminum polychloride comprises an aluminum content, expressed as $Al_2O_3$, below 22%. This content preferably ranges from 5% to 22%. In a more preferred embodiment, said content ranges from 10% to 22%.

It will be appreciated that the aforesaid aluminum polychloride compounds are well known to this art, as are various processes for the synthesis thereof. Such compounds are described, for example, in U.S. Pat. No. 3,929,666 and in FR-2,534,897 and FR-2,584,699.

The compositions/solutions according to the invention additionally comprise at least one compound based on iron(II) and/or on iron(III).

The iron compounds conventionally used in this art as coagulating agents are suitable for purposes of the present invention. Thus, exemplary thereof are the ferrous or ferric iron chlorides or sulfates. The iron-based compounds are preferably iron(II) and/or iron(III) chlorides or ferric iron chlorosulfates.

In another preferred embodiment of the invention, the subject compositions comprise a compound based on iron(III).

The proportion of aluminum polychloride and of the iron-based compound in the subject compositions is such that the aluminum/iron ratio ranges from 1% to 50% (expressed as weight of the elements in the metallic form).

More preferably, said ratio ranges from 10% to 30% and even more preferably from 10% to 20%.

The compositions according to the invention additionally comprise at least one salt selected from among the alkali metal and/or alkaline earth metal halides.

The preferred salts according to the invention are the chlorides.

Moreover, it is preferable to employ alkali metals, such as sodium or potassium especially, whether alone or in admixture.

The concentration of the salt as described above in the subject compositions varies over wide limits and is at most equal to the concentration required to obtain a mixture which is saturated with salt.

For example, and without intending any limitation, the amount of salt ranges from 10% to 40% by weight of the compositions of the invention.

The aforesaid salt concentration is generally a function of the overall iron and aluminum content in the compositions according to the invention. Thus, the higher this overall content, the lower the salt concentration.

However, in another preferred embodiment of the present invention, the salt concentration in the subject compositions ranges from 1 to 5 mol/l.

The compositions according to the invention can additionally comprise additives such as, especially, antifoam agents or, alternatively, flocculating polyelectrolytes. By the term "polyelectrolyte" are intended organic polymers having molecular weights generally greater than one or several million.

All types of polyelectrolytes are suitable according to this invention. Thus, non-ionic or cationic polymers can be used.

Exemplary thereof are the polyacrylamides, poly(ethylene oxide)s, polyvinylpyrrolidones and poly(vinyl alcohol)s, neutral or quaternary polyamines, polyaminoacrylates, polyaminomethacrylates, polyaminoacrylamides or, alternatively polyaminomethacrylamides. Such compounds can be used either alone or in admixture.

The compositions according to the invention include a flocculating polyelectrolyte content ranging from 0% to 2% by weight. The polyelectrolyte content preferably ranges from 0% to 1% by weight.

One technique for the preparation of the compositions of the invention will now be more fully described. It comprises contacting at least one aluminum-based compound, selected from among the basic aluminum polychlorides or polychlorosulfates, with at least one compound based on iron(II) and/or iron(III), the aluminum-based compound and/or the compound based on iron(II) and/or iron(III) being mixed beforehand with at least one salt selected from among the alkali metal and/or alkaline earth metal halides.

It will be appreciated that the compounds based on aluminum and on iron can be used as is, or in solution, the latter option being the preferred.

In such event, the solvent is preferably water.

Thus, one embodiment of the process for the preparation of the compositions according to the invention entails formulating a mixture comprising the aluminum-based compound as described above with at least one of the aforesaid salts and then contacting the mixture with the iron-based compound.

A second embodiment entails a parallel procedure, i.e., admixing at least one of the above salts with the iron-based compound, and then contacting the compounds based on iron and on aluminum.

Finally, a third embodiment entails preparing, on the one hand, a first mixture comprising at least one aluminum-based compound and the salt and, on the other, a second mixture comprising at least one iron-based compound and the salt, and then contacting/intimately admixing the two mixtures thus obtained.

It will be appreciated that the salt (or mixture of salts) employed in the first mixture can be identical to or different from that used in the second mixture.

The composition is preferably prepared via this third embodiment.

The contacting, on the one hand, of the compound based on iron and, on the other, that based on aluminum, these being combined with the salt according to one of the embodiments described above, can be carried out by introducing the first into the second, or vice versa. The simultaneous introduction of the two compounds is also an option.

In one specific embodiment, the iron-based compound is introduced into that based on aluminum.

In the event that the compositions according to the invention comprise additives as indicated above, the introduction of said additives can be carried out before contacting the compounds based on iron and on aluminum, or else after the latter have been admixed.

The amounts and concentrations of the various constituents are adjusted such that they correspond to those required for the compositions of the invention.

The formulation, on the one hand, of the mixtures comprising one or the other of the compounds based on iron or on aluminum with the aforesaid salts and, on the other, the contacting of the mixtures thus prepared, is generally carried out with stirring.

The stirring generally is carried out for from 5 to 60 minutes.

Conventionally, each of the stages of the process for the preparation of the compositions according to the invention is carried out at a temperature in the region of ambient temperature.

Lastly, the present invention also features a process for the treatment/purification of aqueous media using the above compositions.

This is carried out according to conventional techniques in this art. Thus, the "impure" water is contacted with the coagulating agent, in this case a composition according to the invention, in an amount such that the water, after treatment, meets the required specifications.

The pH at which the operation is carried out varies according to the quality of the water to be treated and advantageously ranges from 5 to 10.

The temperature of treatment is generally in the region of ambient temperature.

A number of stages are generally carried out in the water treatment process, differentiated principally by the rate of stirring of the medium to be treated. For example, and without limitation, a first stage, with vigorous stirring, comprises the introduction of the coagulating agent. In a second stage, the rate of stirring is reduced so as to permit coagulation. Finally, a last stage comprises maintaining the water/coagulating mixture at rest in order for the particles to settle. The water is then drawn off and then, optionally, subjected to other conventional purification stages such as, especially, biological nitrification/denitrification, or a chemical or biochemical oxidation stage.

In order to further illustrate the present invention and the advantages thereof, the following specific examples are given, it being understood that same are intended only as illustrative and in nowise limitative.

EXAMPLE 1

This example illustrates the formulation of a composition according to the invention.

Mixture 1:

50 g of aqueous aluminum polychloride having an $Al_2O_3$ content of 11% and a basicity of 76.7%, such compound having the following formula:

$$[Al(OH)_{2.3}Cl_{0.7}][H_2O]_{20.7}$$

were admixed with 5.55 g of NaCl at ambient temperature and a clear aqueous solution was obtained.

Mixture 2:

50 g of ferric chloride solution containing 41% $FeCl_3$ in water were admixed with 6.45 g of NaCl.

A composition according to the invention was then obtained by introducing the Mixture 2 into the Mixture 1 with stirring.

The composition was stable after storage of 12 months.

EXAMPLE 2

The procedure of Example 1 was repeated, except that 5% of a polyelectrolyte (cationic polymer FL1840) was introduced into the composition.

The Mixtures 1 and 2 described in the preceding example were thus intimately admixed and then the polyelectrolyte was introduced, after the Mixtures 1 and 2 provided a homogeneous and clear solution.

A clear aqueous solution was obtained and no precipitate appeared, even after storage for 12 months.

EXAMPLE 3

This example illustrates the use of the composition obtained in Example 1.

Flocculating tests were carried out in a one liter beaker equipped with a stirrer, a motor rotating at a constant rate during each mixing stage, a clock and a system which permitted adjusting the rate and the duration of the stirring.

The procedure employed in these tests was the following:

1. Rapid stirring stage (rate of stirring of 350 rev/min) of 60 seconds, during which the composition was introduced.

The amount of composition injected into the medium to be treated was controlled by means of a micropipette.

2. Slow stirring stage (rate of 30 rev/min) for 10 minutes, during which flocculation occurred.

3. Rest stage (without stirring) of 10 minutes, during which settling of the suspended matter was effected.

The samples were withdrawn after the last stage.

The Suspended Matter (SM) content was analyzed according to NF standard T90-105.

The Chemical Oxygen Demand (COD) was analyzed using an apparatus (DR 2000) marketed by Hach. The technique employed, recommended by this company, entailed a UV-visible absorption measurement, after oxidation of the mixture to be analyzed.

The results obtained are reported in the Table below:

TABLE

| | COAGULATING AGENT | | WATER SEPARATED | | |
|---|---|---|---|---|---|
| | NATURE | AMOUNT | pH | C.O.D. | S.M. |
| Raw water | — | — | 9.05 | 712 | 183 |
| Treated water | Example 1 | 23 | 8.96 | 516 | 48 |
| Treated water | Example 1 | 61 | 8.85 | 486 | 36 |
| Treated water | Example 1 | 122 | 8.73 | 44 | 24 |

The amounts are expressed in μl of coagulating agent/liter of water to be treated.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. In a process of the treatment/purification of an impure aqueous medium by contacting same with a coagulating agent and thence permitting particulate impurities therein to settle, the improvement which comprises using, as the coagulant therefor, a coagulant composition, comprising (i) at least one basic aluminum polychloride or polychlorosulfate, (ii) at least one iron (II) and/or iron (III) compound, and (iii) at least one alkali metal and/or alkaline earth metal halide wherein said at least one basic aluminum polychloride or polychlorosulfate has the general formula:

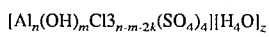

in which n, m and k are positive numbers; 3n-m-k is positive; z is a positive integer at least equal to 1; and k is a number ranging from 0 to 0.4×n, and wherein said basic aluminum polychloride or polychlorosulfate has a (m/3n)× 100 ratio of from 10% to 80%.

2. The process of claim 1, wherein the basic aluminum polychloride or polychlorosulfate in said coagulant composition has a coefficient k of zero.

3. The process of claim 1, wherein said at least one basic aluminum polychloride or polychlorosulfate has an aluminum content expressed as $Al_2O_3$ of no greater than 22%.

4. The process of claim 1, wherein the coagulant composition comprises at least one iron (II) and/or iron (III) compound comprising an iron (II) and/or iron (III) chloride or sulfate, or iron (III) chlorosulfate.

5. The process of claim 1, wherein the coagulant composition comprises iron (III) chloride.

6. The process of claim 1, which comprises a Al/Fe ratio of from 1% to 50%, expressed by weight of metal.

7. The process of claim 1, wherein the coagulant composition comprises at least one alkali metal and/or alkaline earth metal chloride.

8. The process of claim 1, wherein the coagulant composition further comprises a flocculating polyelectrolyte.

9. The process of claim 8, having a flocculating polyelectrolyte content of up to 2% by weight.

10. The process of claim 1, wherein the alkali metal and/or alkaline earth metal halide in the coagulant comprises sodium or potassium.

11. The process of claim 10, wherein said alkali metal and/or alkaline earth metal halide comprises sodium chloride or potassium chloride.

* * * * *